United States Patent [19]

Curran

[11] Patent Number: 4,673,048

[45] Date of Patent: Jun. 16, 1987

[54] SCALE DEVICES

[75] Inventor: Barry D. Curran, West Lawn, Pa.

[73] Assignee: Morgan Corporation, Morgantown, Pa.

[21] Appl. No.: 801,160

[22] PCT Filed: Sep. 23, 1985

[86] PCT No.: PCT/US85/01820

§ 371 Date: Nov. 15, 1985

§ 102(e) Date: Nov. 15, 1985

Related U.S. Application Data

[63] Continuation-in-part of Ser. No. 658,401, Oct. 5, 1984.

[51] Int. Cl.$^4$ .................. G01G 19/52; G01G 5/04
[52] U.S. Cl. .................................. 177/146; 177/208; 177/254
[58] Field of Search .............. 177/141, 146, 208, 209, 177/254

[56] References Cited

U.S. PATENT DOCUMENTS 3,587,760 6/1971 Linz et al. ............................ 177/141
4,589,507 5/1986 Curran ............................ 177/146 X

FOREIGN PATENT DOCUMENTS 56-18729 2/1981 Japan ................................. 177/146

Primary Examiner—George H. Miller, Jr.
Attorney, Agent, or Firm—Z. T. Wobensmith, III

[57] ABSTRACT

A scale device is provided, which can be used in the floor of a truck, trailer or fixed structure, in which it is desired to obtain the weights of various items placed on the floor, and includes one or more retractible pneumatic scale assemblies to selectively engage the items and record their weight, and which includes load responsive members to weigh the items.

6 Claims, 6 Drawing Figures

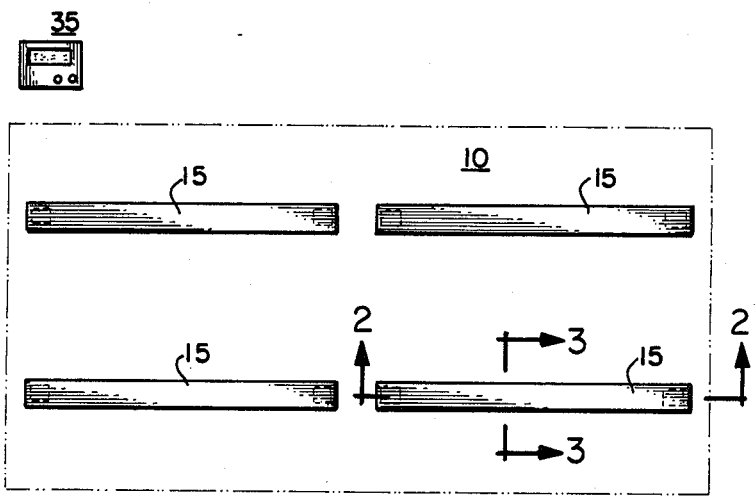
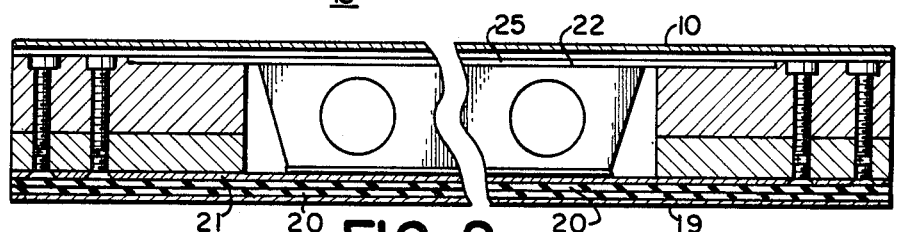
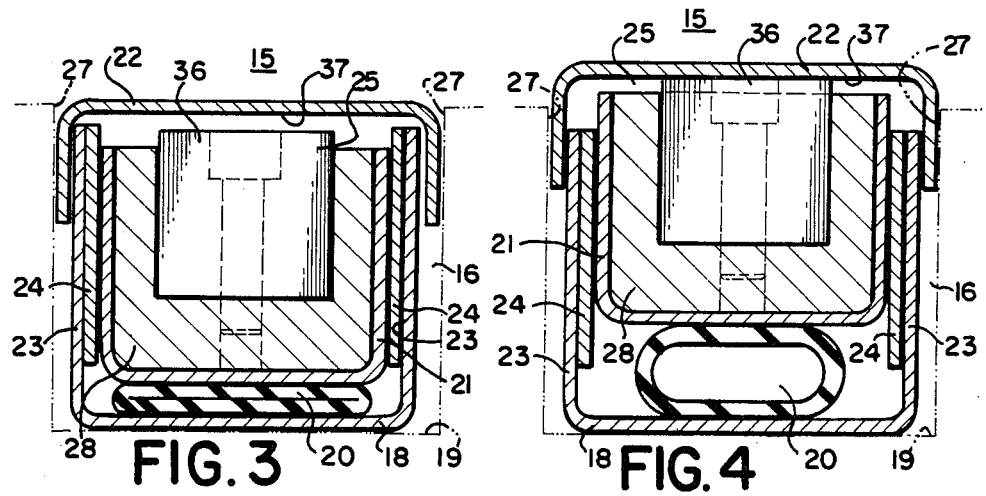
FIG. 1
FIG. 2
FIG. 3
FIG. 4

SCALE DEVICES

CROSS REFERENCE TO RELATED APPLICATIONS

This application is a continuation-in-part of my prior Application Ser. No. 658,401, filed Oct. 5, 1984 entitled "On Board Scale Devices".

BACKGROUND OF THE INVENTION

1. Field of the Invention

This invention relates to scale devices for weighing freight and other items, that are of the type that are normally stored out of the way, and which can be raised into position to contact and weigh the freight.

2. Description of the Prior Art

An important consideration to manufacturers and shippers, is the ability to be able to quickly and easily obtain the weights of various items prior to shipment, which information is needed for calculating charges and is particularly desirable for goods being shipped by air, due to loading restrictions and other considerations.

The U.S. Pat. No. 3,587,670 to Linz discloses a rail-supported transfer vehicle for metallurgical vessels with means for weighing the load supporting thereon. The Linz structure includes an upper and lower carriage with a pressure measuring and load weighing device therebetween, which includes a hydraulic lifting device for the upper carriage, but which device lifts the entire carriage is not protected, nor is it of comparable structure to that of the invention.

Much freight is palletized and characteristically picked up at a variety of customer locations, and then taken to an airport cargo area, or truck terminal where the pallets are assembled with other goods to form a load. Time and space considerations require that structure be provided whereby freight can be weighed at the terminal dock prior to loading or, if desired, can be weighted on the pickup vehicle.

In some instances, it is more convenient to be able to weigh the freight on the pickup vehicle, and then provide the actual weight to the terminal personnel who are assembling the load, or to be able to provide the weight to personnel who are unloading the freight for subsequent shipment, such as by air where weight considerations are of paramount importance.

The apparatus of my invention can be located at the terminal or on the pickup vehicle to weigh the freight, and provide concurrent advantages not found in prior methods of freight weighing.

SUMMARY OF THE INVENTION

This invention relates to scale devices to be used at a stationary location or on a pickup vehicle such as a trailer, truck or other structure to obtain the weights of various items placed on the scale devices, and includes one or more retractible pneumatic scale assemblies for weighing.

The principal object of the invention is to provide scale devices that are capable of being stored out of the way until use.

A further object of the invention is to provide scale devices which permit of traffic thereon, in out of use position, without injury thereto.

A further object of the invention is to provide scale devices wherein the shock load on the device is minimized.

A further object of the invention is to provide scale devices which are simple and inexpensive to construct but sturdy and reliable in operation.

A further object of the invention is to provide scale devices which are suitable for weighing a wide variety of items at fixed or on movable structures.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a top plan view, illustrating one embodiment of scale device of the invention, four being shown;

FIG. 2 is a vertical sectional view, enlarged, of the scale device of FIG. 1, taken approximately on the line 2—2 of FIG. 1;

FIG. 3 is a vertical sectional view, enlarged, of the scale device of FIG. 1, taken approximately on the line 3—3 of FIG. 1, and showing the device in stored out of use position;

FIG. 4 is a view similar to FIG. 3 showing the scale device in condition to contact an item for weighing;

Figure 5:
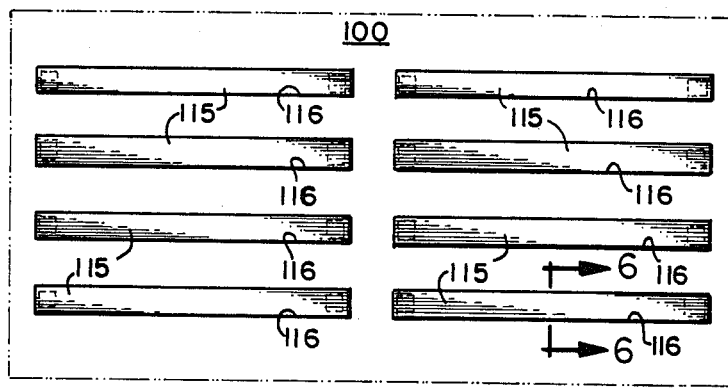
FIG. 5 is a top plan view similar to FIG. 1 but showing eight scale devices.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawings and FIGS. 1-4 thereof, a floor 10 which can be a vehicle floor or which could be the floor of a terminal dock is illustrated in FIG. 1 which, if a freight pickup vehicle, can be a truck, trailer or other structure, and onto which items are placed. The floor 10 is shown as carrying four scale devices 15 of the invention in recesses 16. The devices 15 are of generally rectangular configuration and each include a lower upturned U-shaped channel 18, which rests on the bottom surface 19 of recess 16. A pneumatic lifting assembly 20 is provided which, in FIGS. 2-4, is shown as being an airbag of well known type carried inside of and resting on the channel 18, with a second channel 21 engaged therewith, also of U-shape extending upwardly, and separated from the side walls 23 of channel 18 by guide and wear plates 24.

The airbag 20 is connected to a source of air under pressure (not shown) to selectively provide air for expansion of the airbag to be described.

The channel 21 has a downturned cover plate 22 thereon also of U-shape, which extends over the outside of channel 18 between it and vertical walls 27 of recess 16.

A load beam 25 is provided which extends along channel 21 with at least one load cell 26 engaged therewith, and which cell 26 is carried by a retainer plate 28 which is engaged with channel 21. The load cell 26 is of well known type, and preferably electronic, with leads (not shown) connected to a digital read out panel 35 to display the weight of the item or items being weighed.

Referring now more particularly to FIG. 5, another floor 100 is illustrated which includes a plurality of devices 115, some eight in number being shown, which are carried in recesses 116 in the floor 100. In all other respects, the devices 115 are identical to those illustrated in FIGS. 2, 3, and 4, but for certain applications it may be desirable to utilize more than four devices and, in actuality, as many as are desired and can be accommodated may be used.

Figure 6:
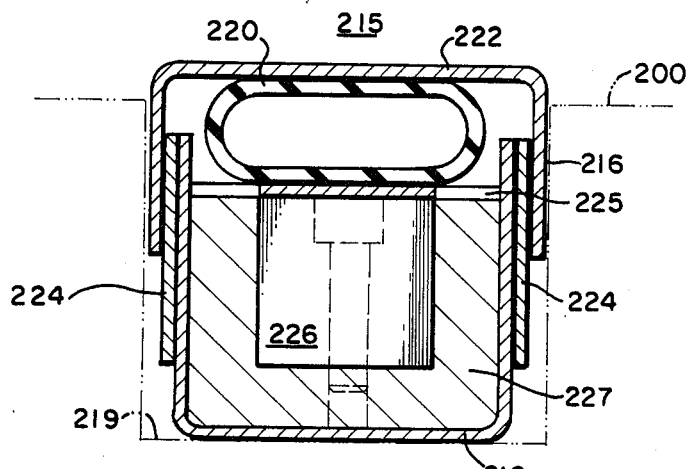
FIG. 6 is a vertical sectional view similar to FIG. 4 but showing another embodiment of the scale device of the invention.

Referring now more particularly to FIG. 6, another embodiment of scale device 215 is therein illustrated, which is carried in a recess 216 of a floor 200. The device 215 is of generally rectangular configuration with a lower upturned U-shaped channel 218, which rests on the bottom surface 219 of recess 216. The channel 218 carries a load beam 225 thereon which extends therealong, and has a load cell 226 carried therein by a retainer plate 227. The load cell 226 is of well known type and can be identical to load cell 26 previously described. The channel 218 on the outside thereof is provided with guide and wear plates 224, over which a cover plate 222 of U-shape extends downwardly into recess 216.

A pneumatic lifting assembly 220 is provided which can be an airbag as described for assembly 20 and is carried on top of load beam 225 between it and the cover plate 222.

The airbag 220 is connected to a source of air under pressure (not shown) for selective expansion as desired to lift the plate 222 into contact with the items (not shown) to be weighed.

The mode of operation will now be pointed out.

Referring to FIGS. 1–4, the airbag 20 is normally in deflated condition as shown in FIGS. 2 and 3 so that the scale device 15 is entirely below the floor 10. When the weight of a pallet (not shown) which contains various items to be weighted is desired, the pallet is picked up, and is placed on one or more of the scale devices 15. The airbag or bags 20 are inflated as shown in FIG. 4, to the desired predetermined pressure, and the channels 21 are elevated so that the tops 36 of the load cells 26 are engaged with the undersides 37 of cover plates 22, thereby transmitting the weight of the pallet and items thereon to the load cell or cells 26. The weight of the freight item or items is displayed on panel 35 and may be recorded. The airbags 20, when in inflated condition, act as a cushion or shock absorber thereby providing protection to the scale devices 15 from impact loads. The airbags 20 are deflated, and the scale devices 15 are retracted to a position below the floor 10 level, where they are protected until use is again required.

Referring to FIG. 6, the airbag 220 is shown in inflated condition for engagement of the items to be weighed. The airbag 220 would start in deflated condition like airbag 20 and, when inflated, lifts cover plate 222 to engage the item or items (not shown) to be weighed, and the weight would be transmitted to the load beam 225, and thereby to the load cell 226 where the weight is ascertained and transmitted to a read out panel (not shown) where it may be read by the operator. The airbag 220 can be deflated and cover plate 222 return to floor level as desired.

It will thus be seen that apparatus has been provided with which the objects of the invention are attained.

I claim:

1. A scale device carried in a recess in a floor for weighing various items which comprises
   cover means for direct selective contact with said items to be weighed,
   load responsive means to measure the weight of said items,
   read out means connected to said load responsive means to indicate the weight of the items, and
   pneumatic lifting assembly means for selective engagement with said load responsive means for transmittal of the weight of said items to said load responsive means.

2. A scale device as defined in claim 1 in which
   said device includes an upturned U-shaped channel assembly which rests in the recess of said floor,
   said pneumatic lifting assembly is carried inside of said channel,
   a second channel is engaged with said pneumatic lifting assembly,
   said load responsive member is a beam,
   a load cell attached to said beam and carried by a retainer plate in said second channel, and
   said cover means is a U-shaped cover plate which can engage said freight items, extend over said first mentioned channel, and is selectively engaged with said load beam.

3. A scale device as defined in claim 2 in which said pneumatic lifting assembly is an airbag.

4. A scale device as defined in claim 2 in which said load cell is of the electronic type.

5. An on board scale device as defined in claim 1 in which
   said scale device includes an upturned U-shaped channel assembly which rests in the recess of said floor on the bottom of said recess,
   said load responsive member is a beam,
   a load cell is carried by said beam,
   said cover means is a U-shaped plate that extends down into said recess over said channel, and
   said pneumatic lifting assembly is carried on said load beam and between it and said cover plate.

6. A scle device as defined in claim 5 in which said pneumatic lifting assembly is an airbag.

* * * * *

UNITED STATES PATENT AND TRADEMARK OFFICE
CERTIFICATE OF CORRECTION

PATENT NO. : 4,673,048

DATED : June 16, 1987

INVENTOR(S) : BARRY D. CURRAN

It is certified that error appears in the above-identified patent and that said Letters Patent is hereby corrected as shown below:

Column 4,

Line 53, before "device" "scle" should be --scale--.

Signed and Sealed this

Seventeenth Day of November, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,673,048

DATED : June 16, 1987

INVENTOR(S) : Barry D. Curran

It is certified that error appears in the above-identified patent and that said Letters Patent is hereby corrected as shown below:

The term of this patent subsequent to May 20, 2003, has been disclaimed.

Signed and Sealed this

Seventh Day of March, 1989

Attest:

DONALD J. QUIGG

Attesting Officer

Commissioner of Patents and Trademarks